(12) United States Patent
Ishita

(10) Patent No.: US 10,681,274 B2
(45) Date of Patent: Jun. 9, 2020

(54) IMAGING APPARATUS AND CONTROL METHOD THEREOF

(71) Applicant: CANON KABUSHIKI KAISHA, Tokyo (JP)

(72) Inventor: Shinya Ishita, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/048,459

(22) Filed: Jul. 30, 2018

(65) Prior Publication Data
US 2019/0045123 A1 Feb. 7, 2019

(30) Foreign Application Priority Data

Aug. 1, 2017 (JP) ................. 2017-149292

(51) Int. Cl.
H04N 5/232 (2006.01)
G06T 7/20 (2017.01)
H04N 5/262 (2006.01)

(52) U.S. Cl.
CPC ........... H04N 5/23245 (2013.01); G06T 7/20 (2013.01); H04N 5/23216 (2013.01); H04N 5/23258 (2013.01); H04N 5/23287 (2013.01); H04N 5/23296 (2013.01); H04N 5/23299 (2018.08); H04N 5/2621 (2013.01)

(58) Field of Classification Search
CPC .......... H04N 5/23245; H04N 5/23216; H04N 5/23258; H04N 5/23299; H04N 5/2621; H04N 5/23296; H04N 5/23287; G06T 7/20

See application file for complete search history.

(56) References Cited

U.S. PATENT DOCUMENTS

2017/0134657 A1\* 5/2017 Mukunashi .......... G02B 27/646

FOREIGN PATENT DOCUMENTS

JP 2010-231153 A 10/2010

\* cited by examiner

Primary Examiner — Yogesh K Aggarwal
(74) Attorney, Agent, or Firm — Cowan, Liebowitz & Latman, P.C.

(57) ABSTRACT

An imaging apparatus includes a CPU and an angular velocity sensor that detects an angular velocity of the imaging apparatus. The CPU acquires a motion vector of an object and calculates an angular velocity of the object based on the motion vector on the image plane of the object and the angular velocity of the imaging apparatus. Additionally, the CPU determines whether or not a panning shot is to be assisted depending on the reliability of the angular velocity of the imaging apparatus and the angular velocity of the object.

9 Claims, 4 Drawing Sheets

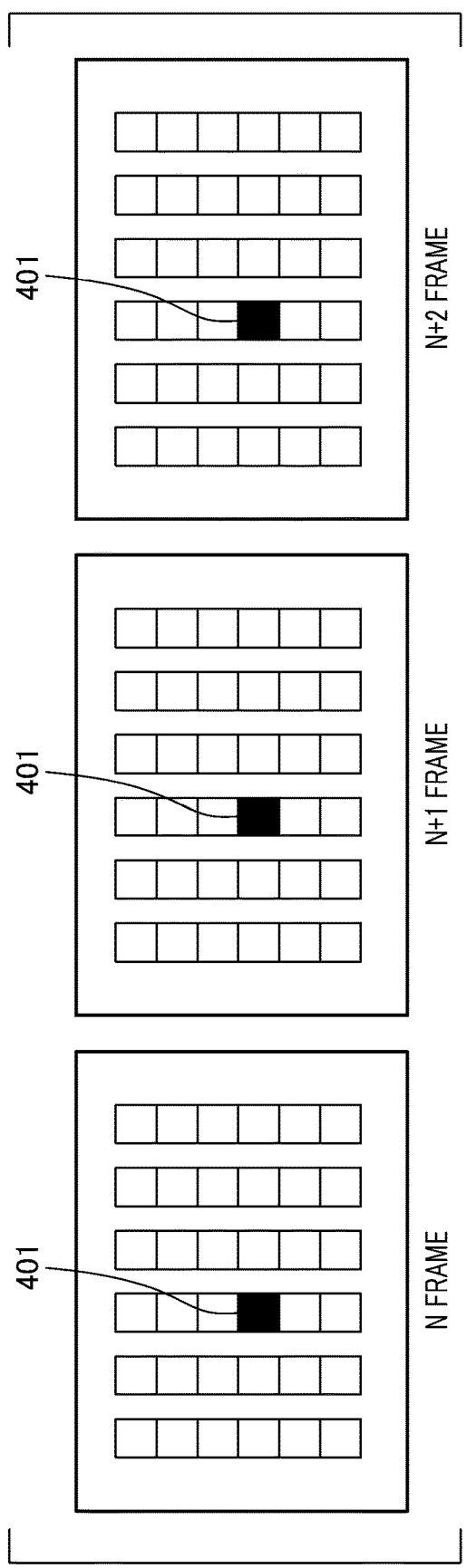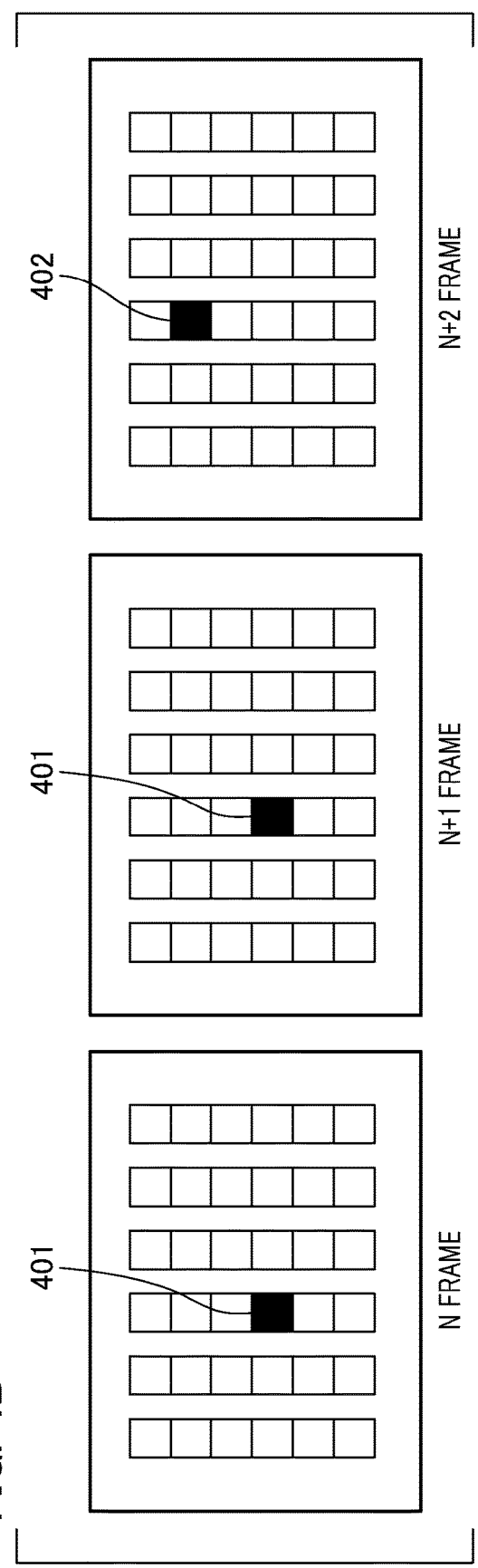

IMAGING APPARATUS AND CONTROL METHOD THEREOF

BACKGROUND OF THE INVENTION

Field of the Invention

The present invention relates to an imaging apparatus and a control method therefor.

Description of the Related Art

A panning shot that is a shooting technique for expressing a sense of speed of a moving object. The panning shot is a shooting technique that keeps the moving object in focus but the background blurred by a panning operation of a camera by a photographer in accordance with the movement of the object. In a panning shot assistant function that drives a shift lens to assist in the panning shot, periodical acquisition of the panning shot information, including panning detection information, gyro information, and vector detection information, is required. Additionally, based on the acquired panning shot information, object angular velocity and object angular acceleration information is generated. The generated object angular velocity and angular acceleration information is communicated to a lens and, in the lens, correction is performed by driving the shift lens based on the difference between the object angular velocity and angular acceleration information and a panning speed, thereby realizing panning shot assistance. As described above, in a panning shot, the acquisition of the panning shot information and, the generation and communication of the correction information are required for a specified number of times. In general, a time until shooting permission of the panning shot becomes longer than that of the normal shooting (the shooting speed becomes slow). Regarding a timing of permitting shooting, Japanese Patent Application Laid-Open No. 2010-231153 discloses a technique that determines whether or not an amount of shaking in the direction of the optical axis is in the range of focusing, and controls whether or not shooting is to be permitted.

However, although the technique disclosed in Japanese Patent Application Laid-Open No. 2010-231153 can perform control so as to prevent shooting until focusing, it cannot ensure the effect of shake correction of an object with high accuracy. Additionally, it is not possible to improve the shooting speed.

SUMMARY OF THE INVENTION

The present invention provides an imaging apparatus that can perform shooting depending on the situation in a mode that assists panning shot shooting.

An imaging apparatus according to the present invention includes a memory; at least one processor configured to perform panning function in accordance with a program stored in the memory; an acquisition unit configured to acquire a motion vector of an object; a detection unit configured to detect an angular velocity of the imaging apparatus; a calculation unit configured to calculate an angular velocity of the object based on the motion vector and the angular velocity of the imaging apparatus; and a determination unit configured to determine whether or not a panning shot is to be assisted depending on the reliability of the angular velocity of the imaging apparatus and the angular velocity of the object.

Further features of the present invention will become apparent from the following description of exemplary embodiments with reference to the attached drawings.

BRIEF DESCRIPTION OF THE DRAWINGS

FIGS. 4A and 4B are explanatory diagrams of vector accuracy.

DESCRIPTION OF THE EMBODIMENTS

First Embodiment

Figure 1:
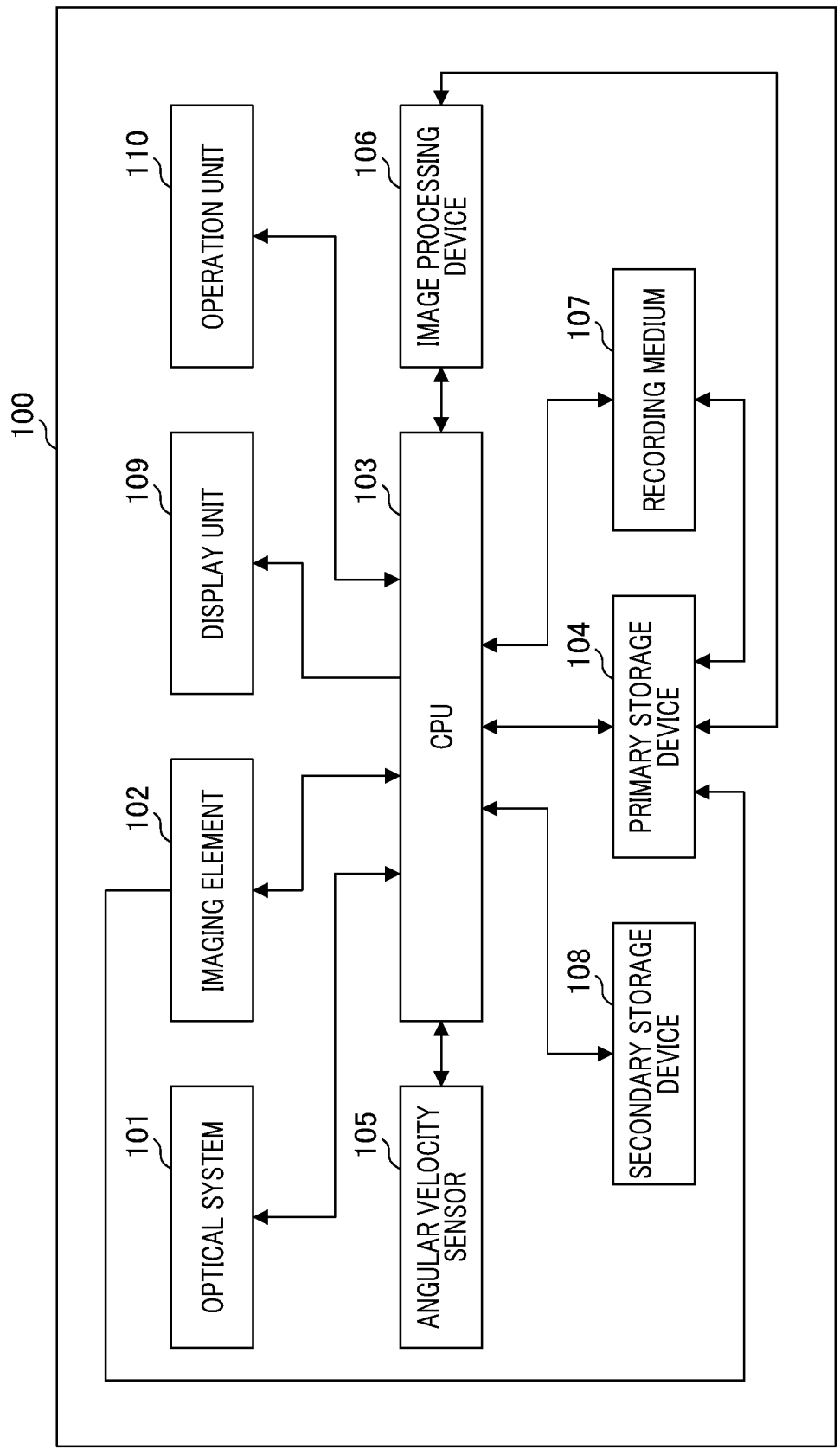
FIG. 1 is a block configuration diagram of an imaging apparatus.

FIG. 1 is a block configuration diagram illustrating a basic configuration of an imaging apparatus 100 according to the present embodiment. The imaging apparatus 100 may be any electronic apparatus having a camera function such as a camera, including a digital camera and a digital video camera, a mobile phone with a camera function, and a computer with a camera. The imaging apparatus 100 includes an optical system 101, an imaging element 102, a CPU 103, a primary storage device 104, an angular velocity sensor 105, an image processing device 106, a recording medium 107, a secondary storage device 108, a display unit 109, and an operation unit 110.

The optical system 101 is an imaging optical system including lenses, a shutter, and a diaphragm, and causes a light from an object to form an image on the imaging element 102 under the control of the CPU 103. The imaging element 102 is an imaging element such as a CCD image sensor and a CMOS image sensor, and has a photoelectric conversion unit that converts the light focused through the optical system 101 into an image signal. The angular velocity sensor 105 is, for example, a gyro sensor, detects an angular velocity indicating a moving amount of the imaging apparatus 100, converts the angular velocity into an electric signal, and transmits the electric signal to the CPU 103. Note that the angular velocity sensor 105 may be included in the optical system 101.

A CPU (Central Processing Unit) 103 is a control unit that realizes the function of the imaging apparatus 100 by controlling each unit configuring the imaging apparatus 100 in accordance with an input signal and a program that has been stored in advance. The primary storage device 104 is a volatile device such as a RAM (Random Access Memory). The primary storage device 104 stores temporary data and is used for work of the CPU 103. Additionally, information stored in the primary storage device 104 is used by the image processing device 106 or recorded on the recording medium 107. The secondary storage device 108 is a nonvolatile storage device such as an EEPROM (Electrically Erasable Programmable Read-Only Memory). The secondary storage device 108 stores programs (firmware) for controlling the imaging device 100 and various setting information, and is used by the CPU 103.

The image processing device 106 performs various image processes on the captured image, such as image processing, which is referred to as "developing processing", color tone adjustment depending on the shooting mode, and the like. Note that at least a part of the functions of the image processing device 106 may be realized by the CPU 103 in software. Note that the imaging apparatus 100 according to the present embodiment has a plurality of patterns for image processing to be applied to the captured image by the image processing apparatus 106, and the pattern can be set from the operation unit 110 as an imaging mode.

The recording medium 107 records, for example, data of an image obtained by shooting, which is stored in the primary storage device 104. Note that the recording medium 107 such as a semiconductor memory card can be detached from the imaging apparatus 100. The data recorded on the recording medium 107 can be read by attaching the recording medium 107 to a personal computer and the like. That is, the imaging apparatus 100 has an attachment and detachment mechanism for the recording medium 107 and a function of reading and writing on the recording medium 107.

The display unit 109 displays, for example, a viewfinder image during shooting, a shot image, or a GUI (Graphical User Interface) image for interactive operation. The operation unit 110 is an input device group that accepts a user's operation and transmits input information to the CPU 103. The operation unit 110 may be, for example, a button, a lever, a touch panel, and the like, as well as an input device using, for example, sound, a line of sight.

Figure 2:
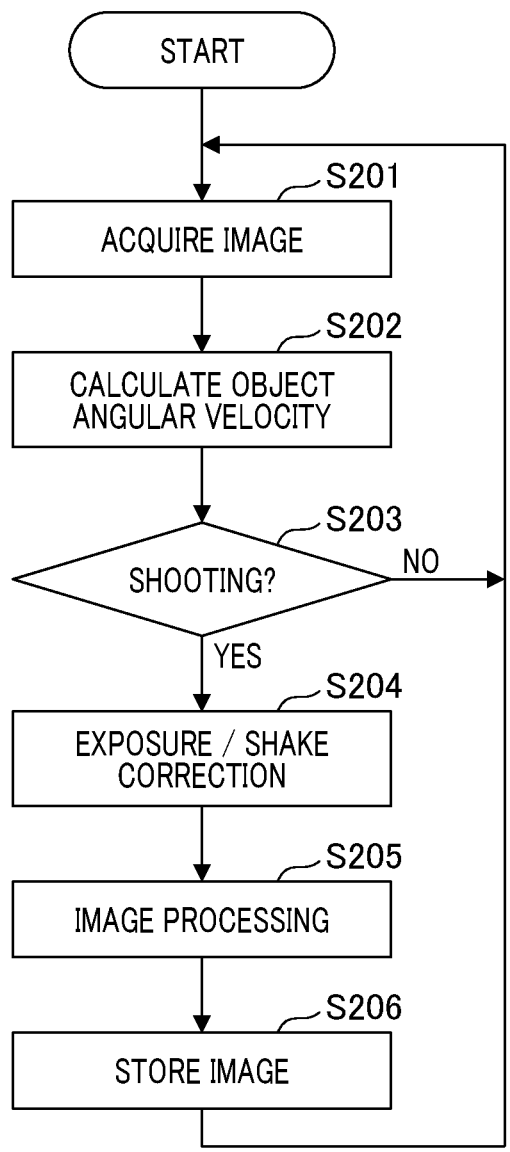
FIG. 2 illustrates a flow of a shooting assistance process.

Here, the processing performed by the CPU 103 in panning shot assistance will be described. The panning shot assistance is a function that supports user's panning shot and compensates for the difference between a moving speed of the object and a panning speed by driving the shift lens and the imaging element. In the present embodiment, after setting the panning shot assistance mode, the user is further allowed to set an assistance priority mode in which priority is given to a panning shot and a continuous shooting priority mode in which priority is given to a shooting speed rather than the panning shot. FIG. 2 is a flowchart illustrating a process for realizing the panning shot assistance function. The CPU 103 receives input of, for example, the push of a power button or a live view start instruction from the operation unit 110 and starts the process.

First, in step S201, the CPU 103 controls the optical system 101 and the imaging element 102 to acquire an image. The acquired image is stored in the primary storage device 104. Additionally, the image is processed by the image processing apparatus 106, transferred to the display unit 109, and displayed as a viewfinder image.

In step S202, the CPU 103 calculates an angular velocity of the object. Specifically, first, based on the motion vector information acquired from the difference between the previous frame image stored in the primary storage device 104 and the current frame image acquired in step S201, an amount of shaking on the image plane of the object is calculated. Here, by arranging a detection frame at a plurality of positions in the image, a plurality of pieces of the motion vector information can be acquired. The angular velocity of the object (angular velocity information) is calculated based on the calculated amount of shaking on the image plane of the object, focal length information acquired from the optical system 101, and an angular velocity of the imaging apparatus 100 acquired from the angular velocity sensor 105. The calculated angular velocity of the object is transferred to the optical system 101 and used in correcting the image shake of the object. Note that the position of the detection frame used for the calculation of the angular velocity of the object may be displayed on the display unit 109 in step S202.

In step S203, the CPU 103 determines whether or not shooting is to be performed. Note that the determination whether or not shooting is to be performed may be determined depending on the presence or absence of a shooting instruction provided from a user by the operation unit 110. Alternatively, the determination may be performed by the CPU 103 by using the result for analyzing the image that has been acquired from the imaging element 102. If it is determined that shooting is to be performed, the process proceeds to step S204. In contrast, if it is determined that shooting is not to be performed, the process returns to step S201, and the processes of step S201 and step S202 are repeated until it is determined that shooting is to be performed in step S203.

In step S204, the CPU 103 performs exposure and shake correction. By controlling the optical system 101, the CPU 103 adjusts an amount of the light to be taken into the imaging element 102 through the optical system 101, and performs exposure. Additionally, the CPU 103 controls the optical system 101 so as to reduce image shake of the object based on the difference between the angular velocity acquired from the angular velocity sensor 105 and the angular velocity of the object calculated in step S202, and performs shake correction. Note that if the optical system 101 includes an angular velocity sensor, the optical system 101 itself may control shake correction.

Upon completion of exposure, in step S205, the CPU 103 controls the image processing apparatus 106 to perform developing processing of the image obtained from the imaging element 102. Next, in step S206, the CPU 103 stores the developed image on the recording medium 107, and the process returns to step S201.

Figure 3:
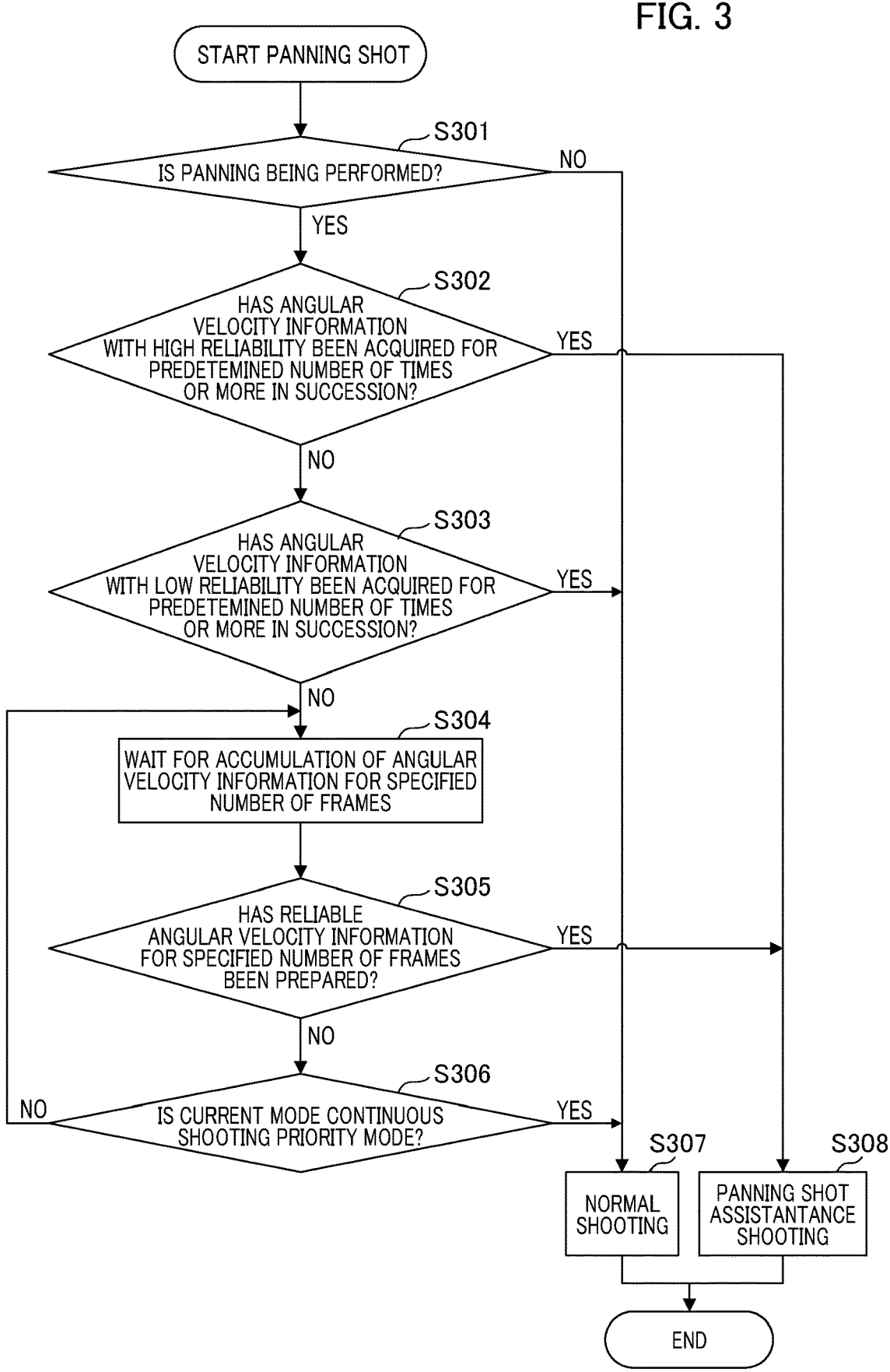
FIG. 3 illustrates a flow of determination processing that permits shooting.

With reference to FIG. 3, the details of the determination processing in step S203, which determines whether or not shooting is to be performed, will be described. FIG. 3 is a flowchart illustrating switching control of shooting permission. In step S301, the CPU 103 determines whether or not a panning shot (panning) is being performed. Specifically, if the shutter of the operation unit 110 is pressed, the CPU 103 determines whether or not panning is being performed based on the angular velocity information detected by the angular velocity sensor 105. The CPU 103 may determine that the panning is not being performed if the angular velocity is 0 or the CPU 103 may determine that the panning is not being performed if the angular velocity is less than a predetermined value. If it is determined that the angular velocity is less than the predetermined value even in a case in which the panning assistance mode is set, in other words, if it is determined that the panning is not being performed, the process proceeds to step S307. In contrast, if it is determined that the angular velocity is equal to or greater than the predetermined value, in other words, if it is determined that panning is being performed, the process proceeds to step S302. The angular velocity information used in step S302 may be information acquired after the shutter of the operation unit 110 is pressed or may be information acquired immediately before the shutter is pressed.

In step 302, the CPU 103 determines whether or not the angular velocity information of an object with high reliability has been acquired for a predetermined number of times in succession. The predetermined number of times may be set in accordance with a required shooting speed and the reliability of object detection. In the present embodiment, the predetermined number of times is set to, for example, three times. In this context, the angular velocity information of the object with high reliability indicates a case in which a motion vector of the object can be calculated in vector detection frames located at the same position among the plurality of vector detection frames. That is, this indicates that the motion vector can be acquired at the same detection position.

A specific example will be described with reference to FIGS. 4A and 4B. FIGS. 4A and 4B illustrate the reliability of motion vectors. The (N+2) frame is the latest image that has been currently acquired, and the (N+1) frame is the image that has been acquired one frame before the (N+2) frame, and the N frame is the image acquired one frame before the (N+1) frame. FIG. 4A illustrates an example in which the angular velocity information of an object with high reliability can be acquired. In the three frames of N frame, the (N+1) frame, and the (N+2) frame, effective object vectors can be acquired from the vector detection frame 401 located at the same position. In contrast, FIG. 4B illustrates an example in which angular velocity information of an object with low reliability is acquired. In the N frame and the (N+1) frame, the object vectors are acquired from the vector detection frames 401 located at the same position. In the (N+2) frame, the object vector is acquired from a vector detection frame 402 located at a position that is different from that of the N frame and the (N+1) frame. Accordingly, in the example of FIG. 4B, it is not possible to acquire a valid vector from the vector detection frames located at the same position in the consecutive frames. If the angular velocity information of the object with high reliability is acquired for the predetermined number of times in succession, the process proceeds to step S308. In contrast, if the angular velocity information of the object with high reliability is not acquired for the predetermined number of times in succession, the process proceeds to step S303.

In step S303, the CPU 103 determines whether or not the angular velocity information of the object with low reliability has been acquired for the predetermined number of times or more in succession. The predetermined number of times may be set according to the required shooting speed and the reliability of object detection, and may be the same as the number of times in step S302, or a different number of times may be set. In the present embodiment, the predetermined number of times is set to, for example, three times. If the angular velocity information of the object with low reliability is acquired for the predetermined number of times or more in succession, the process proceeds to step S307. In contrast, if the angular velocity information of the object with low reliability cannot be acquired in succession for the predetermined number of times or more, the process proceeds to step S304.

In step S304, the CPU 103 waits for the accumulation of the angular velocity of the object for the predetermined number of times. The predetermined number of times may be set according to the required shooting speed. In the present embodiment, the predetermined number of times is set to, for example, five times. Assuming that the predetermined number of times is set to five times, in the flow from step S303, the CPU waits for the accumulation of the angular velocity of the object for two times (5−3=2). Note that the angular velocity information used for determining whether or not it is acquired in steps S302 to S304 is information acquired after the shutter of the operation unit 110 is pressed.

In step S305, the CPU 103 determines whether or not there are angular velocities with a high reliability for the predetermined number of times with respect to the accumulated angular velocities of the object. That is, the CPU 103 determines whether or not the predetermined number of frames of the result of the reliable object detection has been prepared. The predetermined number of times used in step S305 may be set according to the required reliability of the object detection. In the present embodiment, the predetermined number of times is, for example, set to three times. If the angular velocity with a higher reliability is equal to or more than the predetermined number of times, the process proceeds to step S308. In contrast, if the angular velocity with high reliability is less than the predetermined number of times, the process proceeds to step S306.

In step S306, it is determined whether or not the current mode is the continuous shooting priority mode. If the current mode is the continuous shooting priority mode, the process proceeds to step S307. In contrast, if the current mode is the assistance priority mode, the process proceeds to step S304. Specifically, in the continuous shooting priority mode, if the angular velocity information of the object for the predetermined number of times is acquired, normal shooting is performed regardless of the reliability of the angular velocity information. In contrast, in the assistance priority mode, the shooting is not performed until the predetermined number of times of the angular velocity information of the object with high reliability required for performing the panning assistance is prepared. In the assistance priority mode, the calculation of the angular velocity of the object is continued until the angular velocity of the object with high reliability is acquired for the predetermined number of times, and steps S201 to S203 and steps S304 to S306 are repeated.

In step S307, normal shooting is performed instead of a panning shot, and the flow ends. In step S308, the panning shot assistance shooting is performed, and the flow ends. In the panning shot assistance shooting, image shake correction of the object is performed based on the angular velocity of the object, the angular velocity acquired from the angular velocity sensor 105, and shooting by a panning shot is performed.

As described above, according to the present embodiment, if the reliability of the motion vector information is high in chronological order, shooting by a panning shot with high accuracy can be performed by quick panning shot assistance. Additionally, even if the reliability of the motion vector information is low, it is possible to perform quick shooting without shake correction or perform shooting by panning shot assistance with shake correction even though the continuous shooting speed is low, depending on the mode selected by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-149292, filed Aug. 1, 2017, which is hereby incorporated by reference wherein in its entirety.

What is claimed is:

1. An imaging apparatus comprising:
a memory; and
at least one processor configured to perform a panning function in accordance with a program stored in the memory, wherein the program causes the at least one processor function as:
an acquisition unit configured to acquire a motion vector of an object;
a detection unit configured to detect an angular velocity of the imaging apparatus;
a calculation unit configured to calculate an angular velocity of the object based on the motion vector and the angular velocity of the imaging apparatus; and
a determination unit configured to determine whether or not a panning shot is to be assisted depending on a reliability of the angular velocity of the imaging apparatus and the angular velocity of the object,
wherein the determination unit determines that the panning shot is to be assisted if the angular velocity of the imaging apparatus is equal to or greater than a predetermined value and the angular velocity of the object with high reliability has been acquired for a predetermined number of times.

2. The imaging apparatus according to claim 1,
wherein the determination unit determines that the panning shot is not to be assisted if the angular velocity of the imaging apparatus is less than the predetermined value.

3. The imaging apparatus according to claim 1,
wherein the determination unit determines that the panning shot is to be assisted if the angular velocity of the imaging apparatus is equal to or greater than the predetermined value and the angular velocity of the object with high reliability has been acquired for a predetermined number of times in succession.

4. The imaging apparatus according to claim 1,
wherein the determination unit determines that the panning shot is not to be assisted if the angular velocity of the imaging apparatus is equal to or greater than the predetermined value and the angular velocity of the object with low reliability has been acquired for a predetermined number of times in succession.

5. The imaging apparatus according to claim 1,
the program further causes the at least one processor function as a setting unit configured to set a continuous shooting priority mode in which priority is given to a shooting speed or an assistance priority mode in which priority is given to acquisition of an image by a panning shot depending on the selection by a user, in a panning assistance mode that assists the panning shot.

6. The imaging apparatus according to claim 5,
wherein, in setting the continuous shooting priority mode, in a case where the angular velocity of the imaging apparatus is equal to or greater than a predetermined value and the angular velocity of the object is acquired for a predetermined number of times, the determination unit determines that the panning shot is not to be assisted even if the angular velocity of the object with high reliability is not acquired for the predetermined number of times.

7. The imaging apparatus according to claim 5,
wherein if the assistance priority mode is set, the calculation of the angular velocity of the object by using the calculation unit is continued until the angular velocity of the object with highly reliability is acquired for a predetermined number of times.

8. The imaging apparatus according to claim 1,
wherein if a motion vector used to calculate the angular velocity of a plurality of objects is acquired at a same detection position, the determination unit determines that the angular velocity of the objects is high in reliability, and if the motion vector used to calculate the angular velocity of the objects is acquired at a different detection position, the determination unit determines that the angular velocity of the objects is low in reliability.

9. A control method of an imaging apparatus comprising:
acquiring a motion vector of an object;
detecting an angular velocity of the imaging apparatus;
calculating an angular velocity of the object based on a motion vector on an image plane of the object and an angular velocity of the imaging apparatus; and
determining whether or not a panning shot is to be assisted depending on a reliability of the angular velocity of the imaging apparatus and the angular velocity of the object,
wherein the panning shot is to be assisted if the angular velocity of the imaging apparatus is equal to or greater than a predetermined value and the angular velocity of the object with high reliability has been acquired for a predetermined number of times.

* * * * *